Patented June 19, 1934

1,963,749

UNITED STATES PATENT OFFICE 1,963,749

MANUFACTURE OF AROMATIC DICARBOXYLIC ACID CHLORIDES

Lucas P. Kyrides, Webster Groves, Mo., assignor, by mesne assignments, to Monsanto Chemical Company, a corporation of Delaware No Drawing. Application July 30, 1932, Serial No. 627,106

10 Claims. (Cl. 260—123)

This invention relates to the manufacture of aromatic dicarboxylic acid chlorides and it has particular application to the manufacture of phthalyl chlorides and benzoyl chlorides. Heretofore phthalyl chlorides have been made by reacting the corresponding phthalic acid with phosphorous pentachloride.

The object of this invention is to provide an inexpensive method of manufacturing phthalyl chlorides, which may be accompanied by the simultaneous production of valuable by-products such as benzoyl chloride.

A further object of the invention is to provide a process for manufacturing phthalyl chloride from phthalic anhydride by means of inexpensive chlorinating agents and without loss of a substantial proportion of the chlorinating agent.

In D. R. P. 11,494 of 1883 to Jacobsen there is disclosed a process according to which benzotrichloride is caused to react with a variety of acids, salts and esters to form benzoic acid or benzoyl chloride and corresponding acid chlorides. Thus, in accordance therewith, benzotrichloride is caused to react with acetic acid forming benzoic acid, acetyl chloride and hydrogen chloride. By substituting a metal acetate for a portion of the acetic acid the corresponding metal chloride is formed together with benzoic acid and acetyl chloride. Likewise Jacobsen mentions that esters such as ethyl acetate react with benzotrichloride to form benzoic acid esters, acetyl chloride and ethyl chloride. It is to be noted that except in the last mentioned reaction at least a portion of the chlorinating agent is wasted in the form of relatively valueless hydrogen chloride or metal chlorides.

A modification of Jacobsen's process is disclosed in D. R. P. 350,050 wherein benzoyl chlorides are shown to react with acetic acid to form benzoic acid and acetyl chloride. This patent also discloses the substitution of acetic anhydride for the acetic acid whereby acetyl chloride and benzoic anhydride are obtained.

It has likewise been suggested (see article by Rabcewicz-Zubkowski, Rocznidsi Chemji, volume 9, pages 523–529) that benzotrichloride reacts at 50° C. with acetic anhydride in the presence of a small amount of zinc chloride to form acetyl chloride and benzoyl chloride. The reaction is violent in the presence of a substantial amount of zinc chloride According to the present invention aromatic carboxylic acids, salts and anhydrides are reacted with chlorinating agents, such as benzotrichloride, in the presence of a catalyst to form corresponding aromatic acid chlorides.

When a side chain polychlorinated product, such as benzotrichloride, is caused to react with dicarboxylic acid such as oxalic acid, benzoyl chloride and benzoic acid anhydride are formed without the formation of dicarboxylic acid chlorides such as oxalyl chloride. Moreover I have found that when benzotrichloride is heated with dibutyl phthalate in the presence of a catalyst such as zinc chloride no perceptible action ensues at temperatures even as high as 125° C. However, I have found that when the temperature is raised to 200° C. dibutyl phthalate reacts with benzotrichloride forming butyl chloride, benzoyl chloride and phthalic anhydride without evidence of any new ester formation analogous to that reported by Jacobsen. This reaction does not proceed, however, without the formation of substantial amounts of tarry residues. These observations are in marked contrast to the results described by Jacobsen with monocarboxylic acids and their esters.

When phthalic anhydride and benzotrichloride are heated in the presence of a catalyst at a temperature of from 50° C. to 100° C. in a manner analogous to that disclosed by Rabcewicz-Zubkowski, supra, there is no indication of any reaction. I have discovered, however, that if the temperature of the mixture is raised to 150° C. or preferably 180°–200° C. the benzotrichloride reacts with phthalic anhydride forming phthalyl chloride and benzoyl chloride in practically quantitative proportions. The benzoyl chloride can be separated advantageously from the phthalyl chloride by fractional distillation.

In lieu of the anhydride, its homologues and ring substituted derivatives may be employed, such, for example, as chlorphthalic anhydride or dichlorphthalic anhydride. Similarly other chlorinating agents may be employed such as chlorbenzotrichloride, benzal chloride and chlorinated xylenes and similar side chain chlorinated compounds. When benzal chloride is employed benzaldehyde is formed instead of benzoyl chloride.

Although the most efficient results from the standpoint of the chlorinating reagent are obtained by using the anyhydride, phthalyl chloride may be obtained (at the expense of a portion of the reactive chlorine which forms substantially valueless hydrogen chloride or inorganic salts) by substituting phthalic acid or salts of phthalic acid, such as sodium or calcium phthalate, for the phthalic anhydride.

The reaction with the anhydride may be represented structurally as follows:

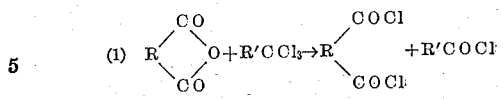

where R is an aromatic nucleus which may or may not embody nuclear substituted groups and R' is an aromatic nucleus which likewise may or may not embody nuclear substituted groups. The reaction with the acid or salt may be represented structurally in the following manner:

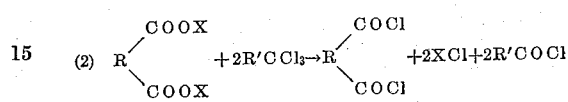

where R and R' are the same as indicated in reaction 1 and X is hydrogen, a monovalent metal radical or its equivalent radical such as sodium, potassium, etc.

In the reactions hereinabove described one employs advantageously a catalyst preferably zinc chloride, aluminum chloride, chromium chloride, copper chloride, etc.

An example of one method of applying the principles of the invention is hereinafter set forth. 450 parts of phthalic anhydride (technical) and 680 parts of technical benzotrichloride (sp. gr. 1.397 and representing a 15% excess over that theoretically required) together with 2.5 parts zinc chloride are heated while maintaining the temperature at approximately 200° C. for about 20 hours. Thereafter the reaction mixture is distilled in vacuo (20–40 mm.) until about 440 parts, consisting of the unreacted benzotrichloride and benzoyl chloride, are distilled. During this period the temperature rises progressively from 85 to 138° C (at about 25 mm.). Subsequently about 580 parts of phthalyl chloride is received in a separate receptacle, the temperature remaining practically constant at 140–145° C. The product may be found to contain a small amount of phthalic anhydride, some of which may be separated in the condenser; an additional amount of phthalic anhydride may be separated from the phthalyl chloride by cooling. Yields of phthalyl chloride amounting to better than 95% of the theroretical are thus obtained.

The rate of reaction may be increased substantially and the time of reaction thereby decreased by raising the temperature. This is done advantageously by using equipment capable of operating under positive pressure conditions. No reaction is perceptible if the temperature of the above reaction mixture is maintained at 100° C. instead of 200° C.

I have likewise discovered that the reaction may be effected at lower temperatures by increasing, substantially, the amount of zinc chloride employed. Thus, for example, a reaction temperature of as low as 100–120° C. may be employed by increasing the amount of zinc chloride employed at the higher temperature described in the foregoing example by approximately twenty-fold. This is illustrated in the following example: 225 parts of phthalic anhydride, 290 parts of benzotrichloride having a specific gravity of 1.38, and 20 parts of technical anhydrous zinc chloride are heated in an oil bath at about 110–120° C. for 20 hours. The reacted mixture is then fractionated whereby one obtains 201 parts of benzoyl chloride and 287 parts of phthalyl chloride which is equivalent to an over-all yield of 96.5%. The residue from the distillation which consists essentially of zinc chloride may be used repeatedly, if desired, or until such time as the accumulated tar by-products make it desirable to discard the residue.

In lieu of zinc chloride which is employed in the foregoing example one may substitute 5 parts of zinc oxide. The zinc oxide probably undergoes reaction forming zinc chloride. Similarly, one may substitute 5 parts of zinc dust in lieu of the zinc chloride or zinc oxide.

Other catalytic compositions may be employed, notably aluminum hydroxide or oxide, iron chloride or hydroxide, aluminum chloride, chromium chloride, copper chloride, etc. Although zinc chloride and oxide are easily the most active compositions which I have found, inorganic polyvalent metal salts or mixtures thereof have the property of accelerating the reaction.

From the example hereinabove set forth, together with the modifications which are indicated, it should be apparent to those skilled in the art that the present invention affords an improved process for manufacturing dicarboxylic aromatic acid chlorides and when the anhydride is employed that it likewise affords efficient utilization of all the available chlorine. It should likewise be apparent that these objects and advantages of the invention flow from the broad inventive concept of reacting a dicarboxylic aromatic anhydride, salt or acid with an aromatic chlorinating agent such as benzotrichloride at elevated temperatures, and preferably, in the presence of a catalyst.

What I claim is:

1. The method of manufacturing phthalyl chloride which consists in heating to reaction temperature benzotrichloride admixed with phthalic anhydride.

2. The method of manufacturing phthalyl chloride which consists in heating to reaction temperature benzotrichloride admixed with phthalic anhydride in the presence of a chloride of a polyvalent non-alkali earth metal as a catalyst.

3. The method of manufacturing ortho phthalyl chloride which consists in maintaining benzotrichloride and ortho phthalic anhydride at approximately 100 to 210° C. in the presence of a chloride of a polyvalent non-alkali earth metal as a catalyst.

4. The method of manufacturing phthalyl chloride which consists in maintaining benzotrichloride and phthalic anhydride at 180–220° C. in the presence of zinc chloride.

5. The method of manufacturing a chloride of an orthodicarboxylic acid of the formula

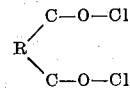

where R is a material selected from a group consisting of phenylene, homologues of phenylene and the nuclear chlor substituted derivatives thereof which consists in heating to reaction temperature a mixture of a compound selected from a group consisting of phthalic anhydride, a homologue thereof and their chlorinated forms and a compound selected from a group consisting of trichlor benzene, homologues of trichlor benzene and their chlorinated forms.

6. The method of manufacturing benzoyl chloride and phthalyl chloride which consists in heating to reaction temperature benzotrichloride admixed with phthalic anhydride.

7. The method as defined in claim 5 and further characterized in the fact that the trichlor benzene composition is derived by the chlorination of one of the methyl groups of xylene.

8. The method as defined in claim 5 and further characterized by the fact that the polychlor substituted benzene composition is derived by the chlorination of the methyl group of toluene.

9. A method of manufacturing phthalyl chlorides which consists in causing a benzotrichloride to react at a temperature above 100° C. with phthalic anhydride.

10. A method of forming the chlorides of the anhydrides of dicarboxylic acids which comprises heating to reaction temperature benzotrichloride, its homologues and their chlor substituted forms and a compound of the formula

where R is one of the group consisting of phenylene, its homologues and their chlor substituted forms.

LUCAS P. KYRIDES.